United States Patent [19]

Silber

[11] 3,830,518

[45] Aug. 20, 1974

[54] SEAT BELT ACTUATING MEANS

[76] Inventor: Terence Brian Silber, 31 Inderwick Rd., London, 8, England

[22] Filed: Dec. 12, 1972

[21] Appl. No.: 314,365

[30] Foreign Application Priority Data
Jan. 24, 1972  Great Britain...................... 3303/72

[52] U.S. Cl. ......................................... 280/150 SB
[51] Int. Cl. ........................................... B60r 21/00
[58] Field of Search ............ 180/82 C; 280/150 SB; 297/385, 386, 387, 388, 389

[56] References Cited
UNITED STATES PATENTS

| 3,554,577 | 1/1971 | Hane | 280/150 SB |
| 3,653,714 | 4/1972 | Gentile | 180/82 C |
| 3,680,883 | 8/1972 | Keppel et al. | 280/150 SB |
| 3,717,216 | 2/1973 | Rothschild | 280/150 SB |

Primary Examiner—Robert J. Spar
Assistant Examiner—Ross Weaver
Attorney, Agent, or Firm—Darby & Darby

[57] ABSTRACT

A seat belt actuator which comprises a seat belt mounting slidably captive within guide means and connected to a reversibly drivable cable adapted to travel in the guide means, movement thereof causing the seat belt mounting to slide along the guide means constraining the attached part of the seat belt to travel therewith.

4 Claims, 9 Drawing Figures

SEAT BELT ACTUATING MEANS

This invention relates to seat belt actuating means.

According to the present invention, there is provided a seat belt actuator which comprises a seat belt mounting slidably captive within guide means and connected to a reversibly drivable cable adapted to travel in the guide means, movement thereof causing the seat belt mounting to slide along the guide means constraining the attached part of the seat belt to travel therewith.

Suitably, the seat belt mounting may be one of the standard types of mounting (which has hitherto been bolted onto a secure portion of the carrying vehicle, such as a door pillar) attached, for example by welding, via tie means, to slide means held captive within guide means. The mounting, tie means and slide means may also be formed as a unitary casting. The guide means may be a rail of substantially ⊔-shaped cross-section though other cross-sections, such as a rail of C-shaped cross-section may clearly be used. The guide means may consist of a first substantially U-shaped section and a second straight section continuous with one arm of the U and running in a direction perpendicular to the plane of the U. Such a guide, when installed, has the straight portion adjacent a door pillar and the U-shaped portion mounted adjacent the vehicle roof. A plurality of seat belt mountings may be employed and one such mounting may serve, for example as described hereinafter, to support another mounting.

The cable may be driven by hand-cranked actuating means, by an electric motor or by actuating means co-operating with the opening or closing of a door of a vehicle adjacent the seat to which the seat belt is fitted. It may also be actuated by a delayed action microswitch installed within the upholstery of the seat or it may also be actuated by the ignition switch. The path of the guide means is arranged so that the guided seat belt mounting travels from an inoperative position to a position restraining forward movement of an occupant of the seat.

In addition to being slidably captive in the guide means, it is important that the seat belt mounting is maintained captive at the limits of its travel. This may be effected by positioning a stop at one of the ends of each rest position of the slide means so that the slide means abuts the stop means when in the rest position; and by positioning at the other of the ends a magnet of sufficient strength to ensure that the slide means remains abutting the stop means. Where the cable actuating means is electrically driven, the slide means may actuate a microswitch positioned at each rest position and connected to the electric drive thereby ensuring no further motion of the cable.

Embodiments of the invention will now be described, by way of example, with reference to the accompanying drawings, in which.

Figure 1:
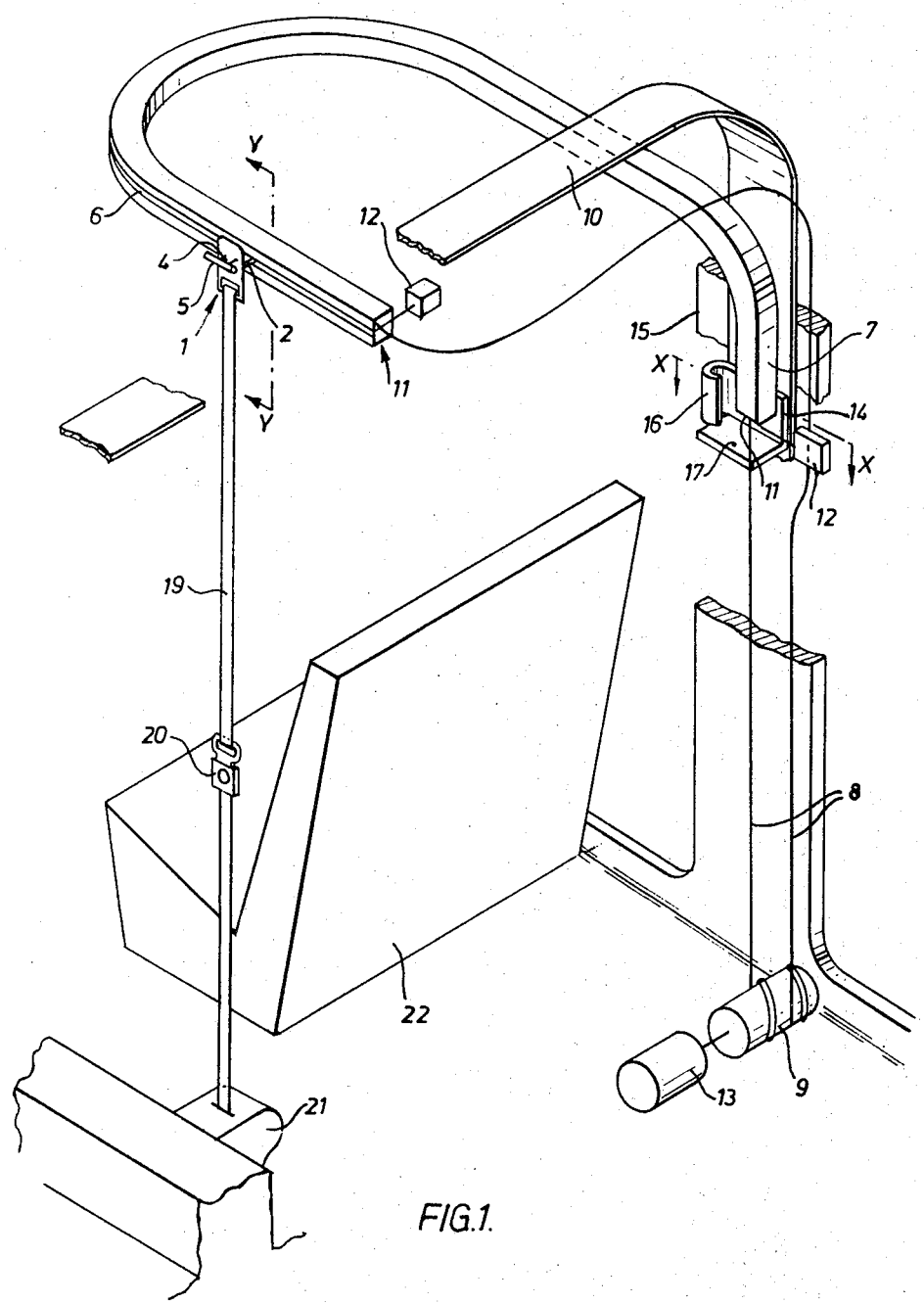
FIG. 1 is a diagrammatic perspective view of one embodiment of the seat belt actuator mounted in position in a vehicle.
Figure 2:
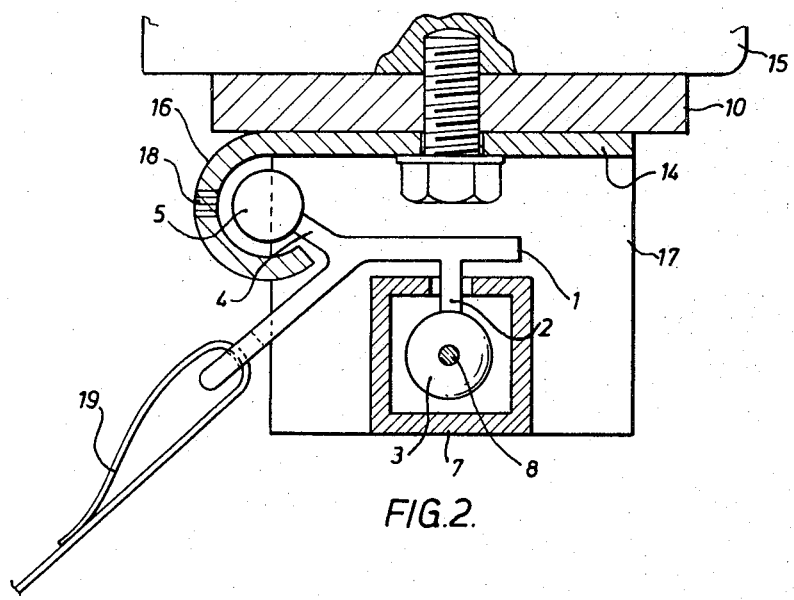
FIG. 2 is a section taken along XX' in FIG. 1 but excluding microswitch detail.
Figure 3:
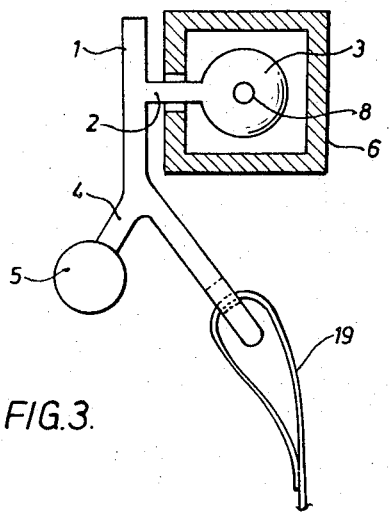
FIG. 3 is a section taken along YY' in FIG. 1.
Figure 4:
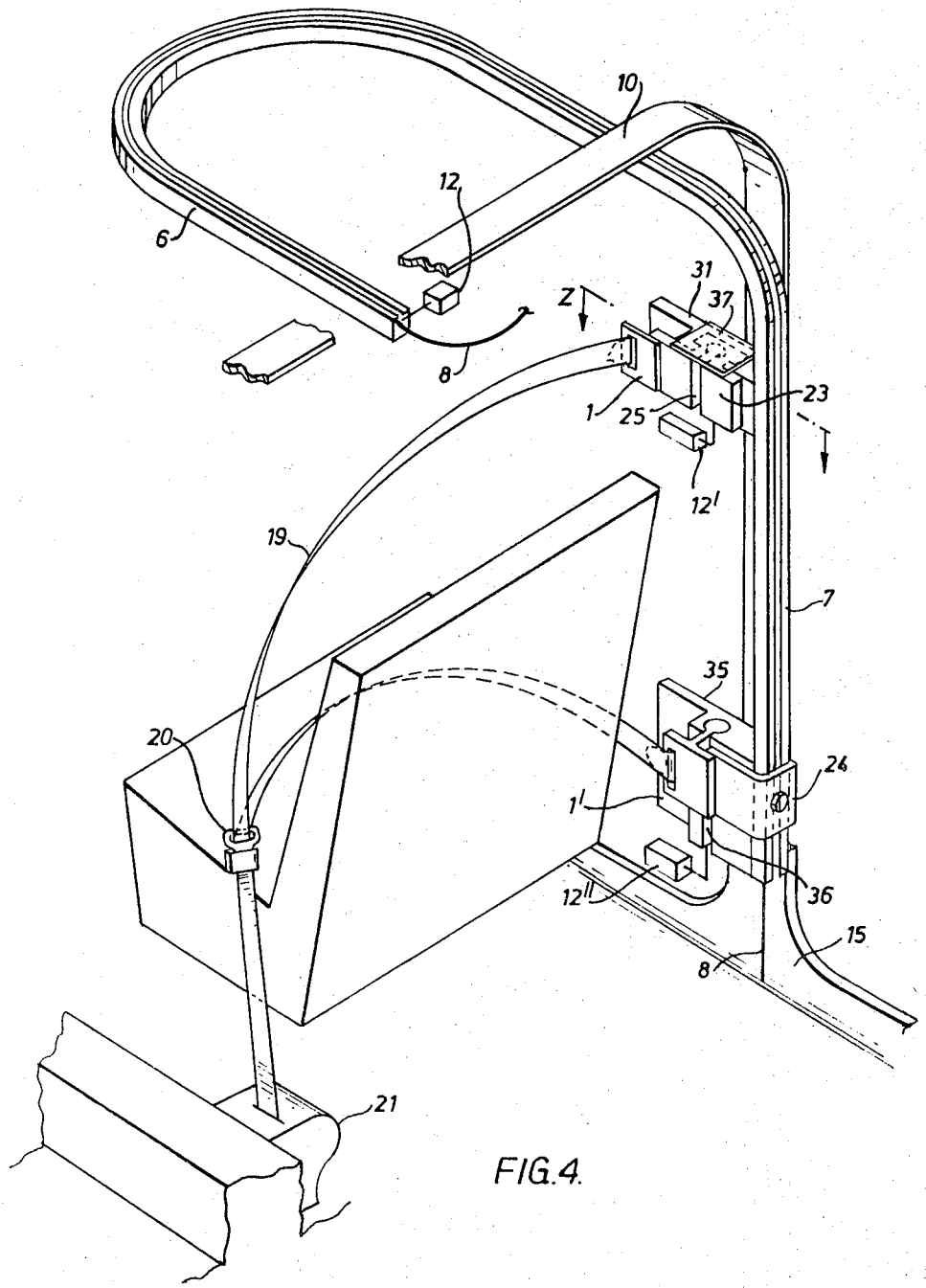
FIG. 4 is a diagrammatic perspective view of another embodiment of a seat belt actuator fitted with a lap belt and a shoulder belt and shown in the restraining position.

Referring to FIGS. 1 to 3 of the drawings, the seat belt actuator comprises a seat belt anchor 1 welded, via tie 2, to a steel ball 3; and welded, via tie 4, to a steel retaining bar 5. The steel ball is slidably and captively mounted within a mild steel guide rail 6 of ⊔-section, the guide rail being of general U-shape and having a limb 7 directed downwards from one of the arms of the U. Both ends of a cable 8 are fixed to the steel ball 3 along a diameter, the cable being adapted to travel in the guide rail, its complete circuit comprising, starting from ball 3, round the guide rail 6; down the limb 7; round a wind-on drum 9; up and along a support bar 10; and back down the guide rail 6. At each end 11 of the guide rail is positioned in a microswitch 12 each of which is connected to a reversible electric motor 13 which drives the wind-on drum 9. At the end 11 contained in limb 7 a bracket 14 is bolted to the support bar which is, in turn, fixed to a door pillar 15; the bracket is formed on one side as a channel 16 flared at its upper end and adapted to house the retaining bar 5, and formed on its lower edge as a seating flange 17 for the seat belt anchor 1. A permanent magnet 18 is set adjacent the channel as an auxiliary seat belt anchor retaining device. The seat belt anchor carries a conventional seat belt 19 which contains a conventional joining buckle 20 as an emergency release, and which is housed in a conventional inertia reel floor fixing 21. The complete guide rail assembly is mounted via support bar 10 as shown over a conventional vehicle seat 22.

The seat belt is secured in position by the occupant taking up a comfortable position in the seat 22 with the seat belt 19 disposed generally as shown in FIG. 1. The occupant then operates a double pole switch (not shown) to cause the motor 13 to drive the drum 9 in a clockwise direction (as seen in FIG. 3) so that the cable 8 causes the seat belt anchor 1 to slide along the guide rail 6 and limb 7 until it rests on the flange 17, having switched off motor 13 via microswitch 12, generally as shown in FIG. 2. The seat belt will then have assumed the conventional diagonal position across the occupant. To release the seat belt, the switch is operated in the opposite sense causing the motor to drive the drum in a clockwise direction so that the cable returns the seat belt anchor 1 to the position shown in FIG. 1 whereupon the motor is switched off via the other microswitch 12.

Referring to FIGS. 4 to 9 of the drawings, in which like numbers denote like parts hereinbefore described, the seat belt anchors 1,1', each anchoring one end of a single seat belt 19 threaded through a joining buckle 20, are rigidly mounted on a first slider 23 and a second slider 24, respectively.

The first slider contains a slot 25 which extends along its length and opens onto the front face 26 thereof; the second slider being mounted in the slot 25. The second slider is substantially T-shaped in section and is maintained captive in slot 25 both by its stem 27 being formed as shown and by two spring-biased stops 28,28' pivotally mounted between the front 26 and rear 29 faces of the first slider mating with holes 30,30' in stem 27.

Figure 8:
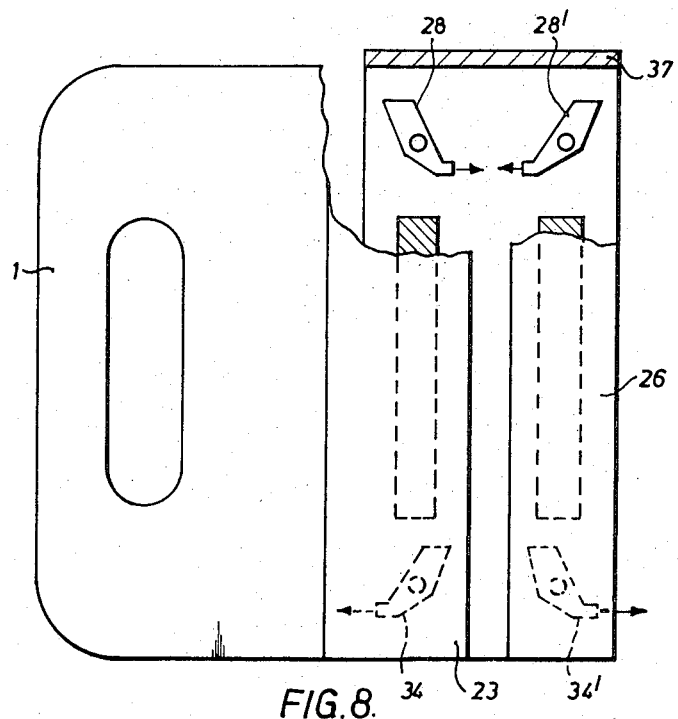
FIG. 8 is a front elevation of a first slider of FIG. 5.
Figure 7:
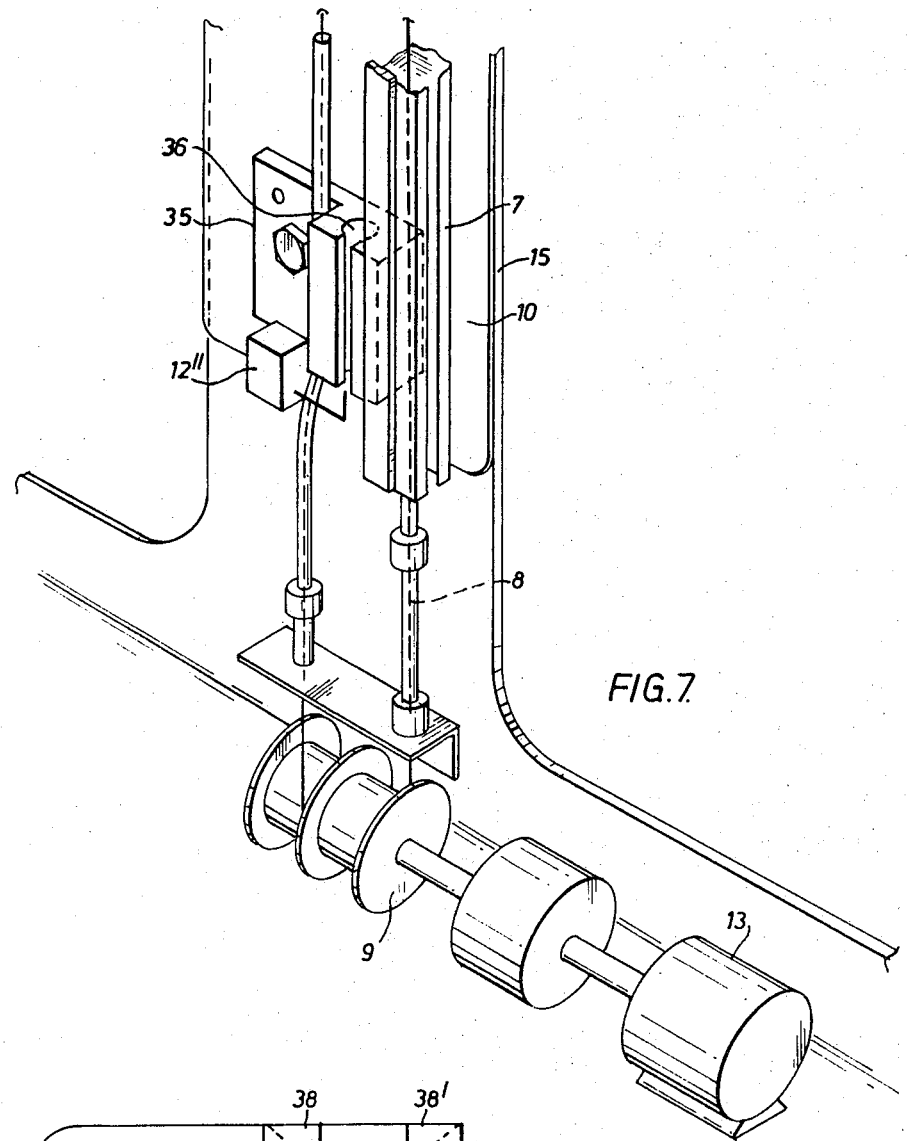
FIG. 7 is a perspective view of a second bracket of FIG. 4.
Figure 9:
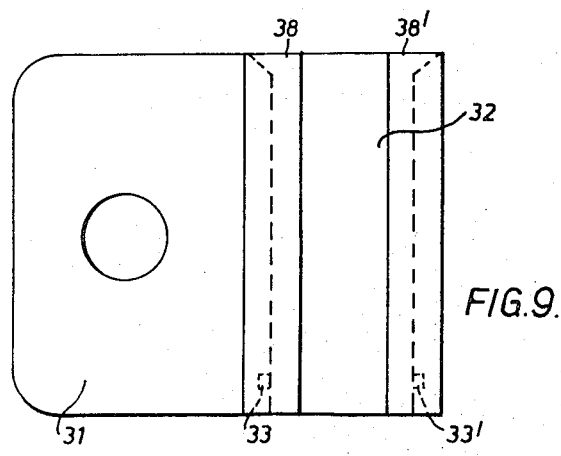
FIG. 9 is a front elevation of the first bracket of FIG. 5.

A first bracket 31 is formed with a slot 32 on the side remote from door pillar 15, the slot 32 being capable of receiving the first slider 23 and containing two holes 33,33' each capable of receiving a spring-biased stop 34,34', respectively. Stops 28 and 34' are biased anticlockwise to the positions as shown in FIG. 8; stops 34 and 28' are biased clockwise.

A microswitch 12' is positioned below the first bracket 31. A second bracket 35 is formed with a slot 36 on the side remote from door pillar 15, the slot being capable of receiving the second slider 24 and a microswitch 12" is also positioned below this bracket. A stop plate 37 is anchored to the top of the first slider 23.

Figure 5:
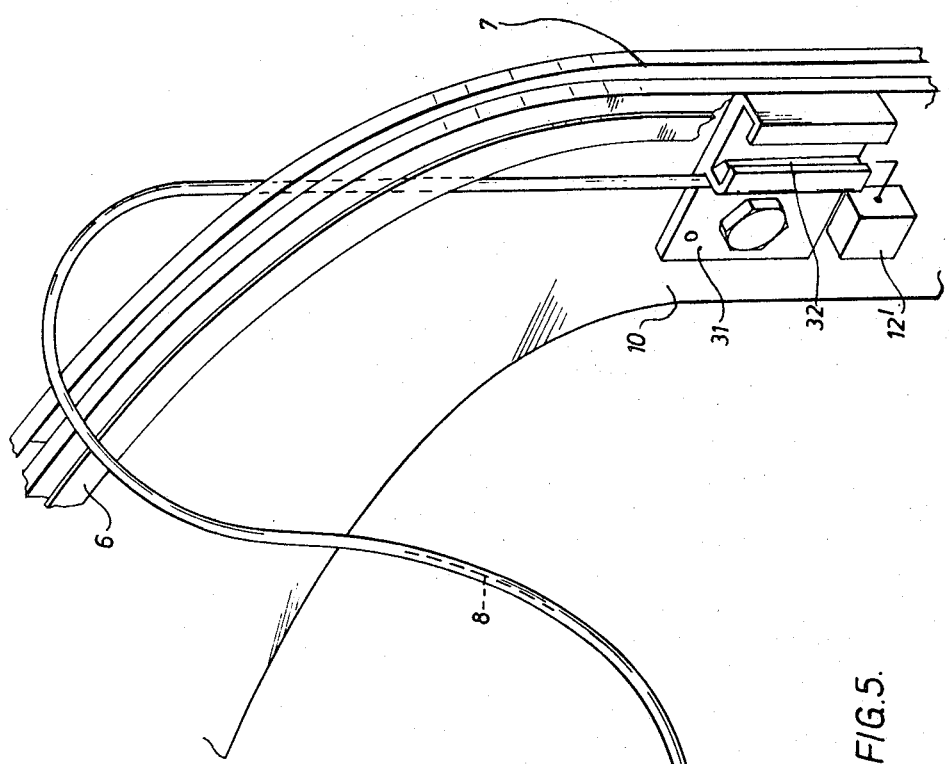
FIG. 5 is a detailed perspective view of a portion of the guide rail of FIG. 4 showing the actuator at rest in the unrestraining position.
Figure 5:
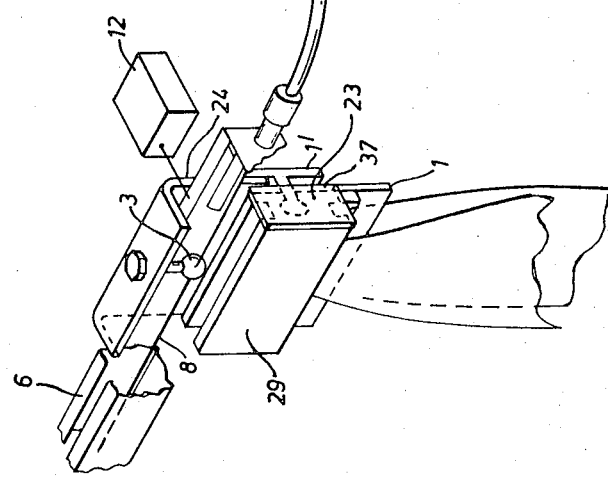
Figure 6:
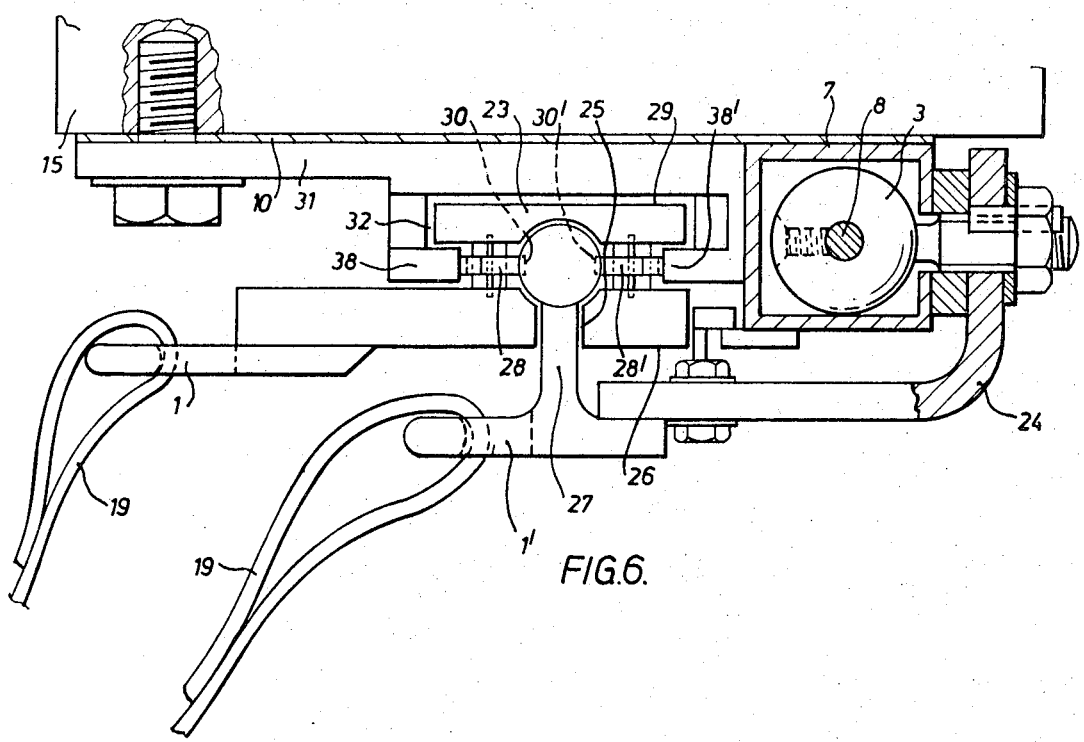
FIG. 6 is a plan, partially sectioned, of a first bracket of FIG. 4.

On operating a switch as described hereinbefore, the cable 8 is actuated causing the second slider 24 which, because stops 28,28' are mated with holes 30,30', drives the first slider 23, initially in the rest position shown in FIG. 5, to slide along the guide rail 6 and down limb 7 until they reach the first bracket 31. As the first slider 23 enters the slot 32, corners 38,38' of the first bracket urge the upper ends of stops 28,28' together thus removing the lower ends of these stops from holes 30,30', respectively, thereby freeing the second slider 24. Shortly thereafter stop plate 37 seats on first bracket 31, restraining further downward motion of the first slider 23 which, at the same time, operates microswitch 12'. The second slider is driven on until it engages in the second bracket 35 and operates microswitch 12", switching off motor 13. As the second slider 24 leaves the first slider 23 the stops 34,34', which ride over holes 30,30', spring into the position shown in FIG. 8, the lower ends thereof mating with holes 33,33', respectively, restraining any upward motion of the first slider 23.

To release the seat belts, the switch (not shown) is operated in the opposite sense causing cable 8 to be driven in the reverse direction. This raises the second slider 24 which, on entering the first slider 23, urges the upper ends of stops 34,34' apart thus removing the lower ends of these stops from holes 33,33', respectively, thereby freeing the first slider 23. On coming into the position shown in FIG. 6, the second slider 24 strikes stop plate 37, thus carrying the first slider 23 with it. As soon as stops 28,28' are clear of the first bracket 31, the lower ends thereof mate with holes 30,30', respectively, thereby ensuring that the second slider 24 remains captive throughout the remainder of the cycle, thereby carrying the first slider 23 with it up limb 7 and second guide rail 6 until motion is arrested by actuation of microswitch 12.

It will be apparent that the support bar of the guide rail may effectively be dispensed with.

I claim:

1. In a vehicle having a passenger compartment and seat located therewithin, a positively locking automatic system for restraining a passenger within said seat comprising:
    a seat belt;
    guide means located within said passenger compartment;
    means connected to one end of said seat belt for anchoring said one belt end along said guide means;

means movably mounted on said guide means for driving said anchoring means along said guide means;
    means provided in said anchoring and driving means for coupling said anchoring and driving means together;
    bracket means located at a fixed position along said guide means for retaining said anchoring means therein;
    means provided in said bracket means for uncoupling said anchoring and driving means upon retention of said anchoring means;
    means provided in said anchoring and bracket means for positively locking said anchoring means within said bracket means; and
    means provided in said driving means for unlocking said anchoring means from said bracket means.

2. A passenger restraint system as recited in claim 1 wherein said driving means is connected to the other end of said seat belt.

3. A passenger restraint system as recited in claim 1 wherein said means for coupling said anchoring and driving means includes at least one pivotally mounted pin provided on either of said driving or anchoring means and a cooperating bore formed in the other of said driving or anchoring means.

4. A passenger restraint system as recited in claim 1 wherein said means for locking said anchoring means within said bracket means includes at least one pivotally mounted pin provided on either of said anchor or bracket means and a cooperating bore formed on the other of said anchor or bracket means.

* * * * *